(12) United States Patent
Kim et al.

(10) Patent No.: US 11,845,850 B2
(45) Date of Patent: Dec. 19, 2023

(54) COMPOSITION, LAMINATE AND WINDOW

(71) Applicant: LMS Co., Ltd., Pyeongtaek-si (KR)

(72) Inventors: Ji Tae Kim, Pyeongtaek-si (KR); Dong Uk Lee, Pyeongtaek-si (KR); Seong Yong Yoon, Pyeongtaek-si (KR); Ho Seong Na, Pyeongtaek-si (KR); Jong Yoon Lee, Pyeongtaek-si (KR); Mi Young Park, Pyeongtaek-si (KR); Sang Hyun Yoon, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 318 days.

(21) Appl. No.: 17/238,100

(22) Filed: Apr. 22, 2021

(65) Prior Publication Data
US 2022/0298326 A1    Sep. 22, 2022

(30) Foreign Application Priority Data

Mar. 19, 2021 (KR) .......................... 10-2021-0035914

(51) Int. Cl.
| | | |
|---|---|---|
| C08K 5/3417 | (2006.01) | |
| C03C 17/00 | (2006.01) | |
| C08K 3/22 | (2006.01) | |
| C08K 5/00 | (2006.01) | |
| C09D 139/06 | (2006.01) | |
| C09D 175/14 | (2006.01) | |

(52) U.S. Cl.
CPC .......... *C08K 5/3417* (2013.01); *C03C 17/007* (2013.01); *C03C 17/009* (2013.01); *C08K 3/22* (2013.01); *C08K 5/0091* (2013.01); *C09D 139/06* (2013.01); *C09D 175/14* (2013.01); *C03C 2217/445* (2013.01); *C03C 2217/475* (2013.01); *C03C 2217/485* (2013.01)

(58) Field of Classification Search
None
See application file for complete search history.

(56) References Cited

U.S. PATENT DOCUMENTS

| | | | | |
|---|---|---|---|---|
| 2011/0075243 A1* | 3/2011 | Moon | .................... | C03C 17/42 359/288 |
| 2016/0376457 A1 | 12/2016 | Kim | | |
| 2017/0307910 A1* | 10/2017 | Nishio | ................... | G02B 5/008 |

FOREIGN PATENT DOCUMENTS

| | | |
|---|---|---|
| CN | 106280678 A | 1/2017 |
| KR | 10-1319263 B1 | 10/2013 |
| KR | 10-2146390 B1 | 8/2020 |

OTHER PUBLICATIONS

Korean Office Action dated Feb. 21, 2023 issued in Patent Application No. 10-2021-0035914 (5 pages).

* cited by examiner

*Primary Examiner* — David Sample
(74) *Attorney, Agent, or Firm* — POLSINELLI PC

(57) ABSTRACT

The present disclosure provides a composition through which a laminate which is aesthetically excellent is formed by exhibiting a blue-based color, which is a general window color, and through which a laminate having high visible light transmittance and an excellent thermochromic property is formed while enabling mass production, and the present disclosure further provides a laminate formed through the above composition and a window including the laminate.

17 Claims, 2 Drawing Sheets

COMPOSITION, LAMINATE AND WINDOW

CROSS-REFERENCE TO RELATED APPLICATION

This application claims priority to and the benefit of Korean Patent Application No. 10-2021-0035914, filed on Mar. 19, 2021, which is incorporated herein by reference in its entirety.

BACKGROUND

Field of the Disclosure

The present disclosure relates to a composition, a laminate formed of the composition, and a window formed of the composition.

Description of the Background

Recently, various products for saving energy are being released. Among the products, smart windows that control the infrared transmittance of sunlight coming from the outside are attracting attention.

Vanadium dioxide (VO2) nanoparticles are representative compounds applied to smart windows. Vanadium dioxide (VO2) nanoparticles having monoclinic insulator properties are based on a phase transition temperature (in other words, a critical temperature) and are phase-transitioned to a metal phase at the phase transition temperature or more. Such a characteristic is called a metal-insulator transition (MIT) characteristic and is a reversible reaction.

Vanadium dioxide (VO2) nanoparticles have almost no change in transmittance according to temperature in a visible light range (wavelength band of about 400 to 700 nm). However, the vanadium dioxide (VO2) nanoparticles have high infrared transmittance at temperatures lower than or equal to a phase transition temperature in an infrared ray range (wavelength band of about 700 to 2,500 nm) and have low infrared transmittance at temperatures higher than the phase transition temperature due to the MIT characteristic thereof.

In smart windows to which vanadium dioxide (VO2) nanoparticles are applied, a phase transition temperature is set to be higher than the temperature in summer and to be lower than the temperature in winter, and thus it is possible to block infrared rays that increase indoor temperature in summer and allow the infrared rays to pass therethrough in winter. Therefore, efficient energy use is possible.

In the conventional smart windows to which vanadium dioxide (VO2) nanoparticles are applied, a film coated with the vanadium dioxide (VO2) nanoparticles is used, and a vanadium dioxide (VO2) nanoparticle solution having a low concentration is applied to an entire surface of a base material to have a small thickness of about several hundred nanometers in order to apply a roll-to-roll process. For example, in Patent Document 1, a graphene-based VO2 laminate for a smart window, which includes a graphene layer having at least one layer, a vanadium dioxide layer formed on an upper surface of the graphene layer, and a functional layer having one or more layers formed on at least one surface of the vanadium dioxide layer, is disclosed.

However, there is a problem in that, when a thin film layer is formed by applying a vanadium dioxide (VO2) nanoparticle solution, the film layer exhibits a muddy brown color, which is not aesthetically pleasing, thereby reducing consumers' purchasing desire, and it is not possible to secure high transmittance for visible light.

SUMMARY

The present disclosure is directed to providing a composition through which a laminate which is aesthetically excellent is formed by exhibiting a blue-based color, which is a general window color.

The present disclosure is also directed to providing a composition through which a laminate having high visible light transmittance and an excellent thermochromic property is formed while enabling mass production.

The present disclosure is also directed to providing a laminate formed through the above composition and a window including the laminate.

According to an aspect of the present disclosure, there is provided a composition which includes a phase transition material and a coloring component and which may form a layer whose transmittance for light having a wavelength of 550 nm is 30% or more and whose absolute value of $\Delta T2400$ according to Formula 1 below is 15% of more is formed.

$$\Delta T2400 = T2400.L - T2400.H \quad \text{[Formula 1]}$$

In Formula 1, $T2400.L$ denotes a transmittance of the layer for light having a wavelength of 2,400 nm at 25° C., and $T2400.H$ denotes a transmittance of the layer for light having a wavelength of 2,400 nm at 85° C.

According to another aspect of the present disclosure, there is provided a laminate including a base material layer and a phase transition layer which is formed on one or both surfaces of the base material layer and formed of the composition according to an aspect of the present disclosure.

According to still another aspect of the present disclosure, there is provided a window including a glass layer and a phase transition layer which is formed on one or both surfaces of the glass layer and formed of the composition according to an aspect of the present disclosure.

BRIEF DESCRIPTION OF THE DRAWINGS

The above features and other advantages of the present disclosure will become more apparent to those of ordinary skill in the art by describing exemplary aspects thereof in detail with reference to the accompanying drawings, in which.

DETAILED DESCRIPTION

Figure 1:
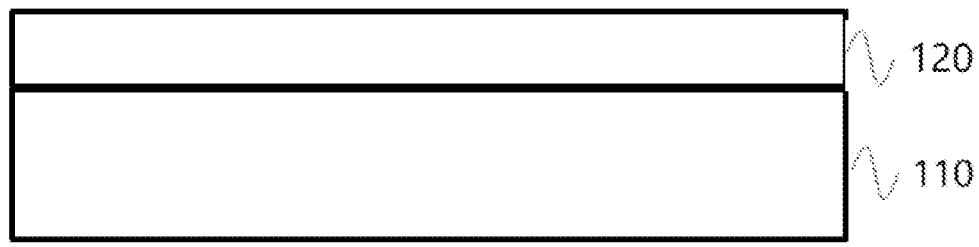
FIGS. 1 and 2 illustrate structures of laminates according to an example of the present disclosure.

The term "visible light" used in the present disclosure refers to light having a wavelength ranging from about 400 nm to 700 nm.

The term "infrared ray" used in the present disclosure refers to light having a wavelength ranging from about 700 nm to 2,500 nm.

The term "thermochromic" used in the present disclosure may refer to a change in property according to temperature and, in particular, may refer to a change in transmittance for light due to a phase transition of a material according to temperature.

The term "room temperature" used in the present disclosure may refer to a temperature in a natural state in which the temperature is not specifically increased or decreased and may refer to any one temperature within a range of about 10° C. to 30° C., for example, a temperature of about 15° C. or more, about 18° C. or more, about 20° C. or more, about 23° C. or more, or about 27° C. or less.

The term "visible light transmittance" or "high visible light transmittance" used in the present disclosure may mean that a transmittance T550 for light having a wavelength of 550 nm is 30% or more.

The term "excellent thermochromic property" used in the present disclosure may mean that an absolute value of ΔT2400 according to Formula 1 below is 15% or more.

$$\Delta T2400 = T2400.L - T2400.H \quad \text{[Formula 1]}$$

In Formula 1, T2400.L denotes a transmittance of a film for light having a wavelength of 2,400 nm at a temperature of 25° C., and T2400.H denotes a transmittance of the film for the light having the wavelength of 2,400 nm at a temperature of 85° C.

The term "identical to" used in the present disclosure means that not only elements are physically completely the same but also means that elements may be regarded as substantially the same within an error range.

The term "absorption peak" used in the present disclosure may refer to a point, at which a slope is changed from positive to negative or from negative to positive and an instantaneous slope is zero, in an absorption rate graph according to a change in wavelength measured under specific conditions.

The term "maximum absorption peak" used in the present disclosure may refer to a point, at which an absorption rate is highest, in an absorption rate graph according to a change in wavelength measured under specific conditions. Further, specifically, the maximum absorption peak may refer to a point having the highest absorption rate in a wavelength range of 100 nm to 3,000 nm.

The term "X-ray diffraction (XRD) analysis" used in the present disclosure may refer to a process of obtaining a peak intensity measured by preparing an XRD analysis sample and by emitting a laser beam to the XRD analysis sample using an X-ray diffraction analyzer. The XRD analysis is not particularly limited to any analysis as long as the peak intensity may be obtained but, specifically, the XRD analysis may be in accordance with a method described in a method for measuring physical properties of the present disclosure.

The term "absorbance spectrum" or "transmittance spectrum" used in the present disclosure may refer to an absorbance or transmittance spectrum for a corresponding material itself, and may refer to an absorbance or transmittance spectrum for a coating film in which the corresponding material is evenly dispersed in a transparent resin (e.g., a polyethylene terephthalate resin, etc.).

A composition according to an example of the present disclosure may include a phase transition material and a coloring component.

The phase transition material is a material whose infrared transmittance is changed by heat and may allow the composition to form a layer whose absolute value of ΔT2400 according to Formula 1 below is 15% or more.

$$\Delta T2400 = T2400.L - T2400.H \quad \text{[Formula 1]}$$

In Formula 1, T2400.L denotes a transmittance of a film for light having a wavelength of 2,400 nm at a temperature of 25° C., and T2400.H denotes a transmittance of the film for the light having the wavelength of 2,400 nm at a temperature of 85° C.

Further, the phase transition material may include vanadium dioxide (VO2) particles. As described above, the vanadium dioxide (VO2) particles have almost no change in transmittance according to temperature in a visible light range. However, the vanadium dioxide (VO2) particles have high infrared transmittance at temperatures lower than or equal to the phase transition temperature in an infrared ray range and have low infrared transmittance at temperatures higher than the phase transition temperature due to a metal-insulator transition (MIT) characteristic.

A phase transition temperature is set to be higher than the temperature in summer and to be lower than the temperature in winter using the vanadium dioxide (VO2) particles, and thus it is possible to block infrared rays that increase indoor temperature in summer and allow the infrared rays to pass therethrough in winter.

An average particle size of the vanadium dioxide (VO2) particles included in the phase transition material may be 30 nm or more, 35 nm or more, 40 nm or more, 45 nm or more, or 50 nm or more, and, in another example, the average particle size may be 150 nm or less, 140 nm or less, 130 nm or less, 120 nm or less, or 110 nm or less. Here, the average particle size of the vanadium dioxide (VO2) particles may be within a range formed by appropriately selecting limits from among the upper and lower limits listed above.

In this case, the average particle size of the vanadium dioxide (VO2) particles is a so-called D50 particle diameter (median particle diameter) and may refer to a particle diameter at a cumulative value of 50% based on the volume of a particle-size distribution. That is, the particle-size distribution may be obtained based on the volume, and the particle diameter at a point where the cumulative value becomes 50% in a cumulative curve in which a total volume is 100% may be referred to as an average particle diameter. The above-described D50 particle diameter may be measured using a laser diffraction method.

When the average particle size of the vanadium dioxide (VO2) particles satisfies the above range, an excellent thermochromic property may be secured.

The phase transition material may have a Δλcut.v in Formula 5 below that satisfies 10 nm or more, 12.5 nm or more, 15 nm or more, 17.5 nm or more, or 20 nm or more.

$$\Delta\lambda cut.v = \lambda cut.v.25 - \lambda cut.v.85 \quad \text{[Formula 5]}$$

In Formula 5, λcut.v.25 denotes the shortest wavelength at which the phase transition material in isopropyl alcohol exhibits a transmittance of 50% at a wavelength of 600 nm or more at 25° C., and λcut.v.85 denotes the shortest wavelength at which the phase transition material in the isopropyl alcohol exhibits a transmittance of 50% at the wavelength of 600 nm or more at 85° C.

The phase transition material may have a ΔTv in Formula 6 below that satisfies 15% or more, 16% or more, 17% or more, 18% or more, 19% or more, or 20% or more.

$$\Delta Tv = Tv25 - Tv85 \quad \text{[Formula 6]}$$

In Formula 6, Tv25 denotes an average transmittance of the phase transition material in the isopropyl alcohol in a wavelength range of λcut to 2,400 nm at 25° C., Tv85 denotes an average transmittance of the phase transition material in the isopropyl alcohol in the wavelength range of λcut to 2,400 nm at 85° C., and λcut denotes the shortest wavelength at which the phase transition material in the isopropyl alcohol exhibits a transmittance of 50% in a wavelength range of 600 nm to 1,000 nm at a corresponding temperature.

As described above, the composition according to the example of the present disclosure may include a coloring component in addition to the phase transition material.

In the case of forming a layer of a composition containing a phase transition material, the layer exhibits a muddy brown color, which is not aesthetically pleasing, thereby reducing consumers' purchasing desire.

The coloring component is additionally contained in the composition containing the phase transition material, and thus, in the case of forming a layer of the composition, the above-described problem may be solved by making the layer exhibit a blue-based color, which is a general window color.

The coloring component may be capable of enabling color correction without affecting the visible light transmittance and the thermochromic property of the phase transition material.

Further, the coloring component may have high transmittance for visible light and high transmittance for infrared rays. In this case, the transmittance for visible light and the transmittance for infrared rays may be checked by dispersing the coloring component in a specific solvent, the specific solvent is not particularly limited as long as it can disperse the coloring component in the solvent without decomposing the coloring component, and examples of the solvent may include alcohols such as methanol, ethanol, propanol, and the like. In particular, in a specific solvent, the coloring component may have high transmittance for infrared rays at a wavelength of 900 nm or more.

In ethanol, the coloring component may have a maximum absorption peak at a wavelength of 250 nm or more, 260 nm or more, 270 nm or more, 280 nm or more, 290 nm or more, 300 nm or more, or 310 nm or more at 25° C., and, in another example, may have a maximum absorption peak at a wavelength of 400 nm or less, 390 nm or less, 380 nm or less, 370 nm or less, 360 nm or less, 350 nm or less, 340 nm or less, or 330 nm or less. Here, the maximum absorption peak of the coloring component in the ethanol may be within a range formed by appropriately selecting limits from among the upper and lower limits listed above. In the case in which the maximum absorption peak of the coloring component in the ethanol satisfies the above range, when a layer is formed of the composition, the layer exhibits a blue-based color.

The coloring component may have a $\Delta\lambda$ in Formula 7 below that satisfies 100 nm or more, 120 nm or more, 130 nm or more, 140 nm or more, or 150 nm or more, and, in another example, may have a $\Delta\lambda$ that satisfies 200 nm or less, 190 nm or less, 180 nm or less, or 170 nm or less. Here, $\Delta\lambda$ may be within a range formed by appropriately selecting limits from among the upper and lower limits listed above.

$$\Delta\lambda = \lambda L - \lambda S \quad \text{[Formula 7]}$$

In Formula 7, $\lambda L$ denotes the longest wavelength at which the coloring component in an ethanol solvent exhibits a transmittance of 50% in a wavelength range of 300 nm to 600 nm at 25° C., and $\lambda S$ denotes the shortest wavelength at which the coloring component in the ethanol solvent exhibits a transmittance of 50% in the wavelength range of 300 nm to 600 nm at 25° C.

In the case in which the coloring component has a $\Delta\lambda$ in Formula 7 above that satisfies the above range, even when the composition further includes the coloring component to form a layer, it is possible to prevent a decrease in transmittance for visible light and perform color correction.

In the ethanol, the coloring component may have an absorption peak at a wavelength of 500 nm or more, 520 nm or more, 540 nm or more, 560 nm or more, or 580 nm or more at 25° C., and, in another example, may have a maximum absorption peak at a wavelength of 800 nm or less, 780 nm or less, 760 nm or less, or 740 nm or less. Here, the absorption peak of the coloring component in the ethanol may be within a range formed by appropriately selecting limits from among the upper and lower limits listed above. In the case in which the absorption peak of the coloring component in the ethanol satisfies the above range, when a layer is formed of the composition, the layer exhibits a blue-based color.

In the ethanol, the coloring component may have an average transmittance of 50% or more, 55% or more, 60% or more, or 65% or more in a wavelength range of 350 nm to 550 nm at 25° C. In the case in which the average transmittance of the coloring component in the ethanol satisfies the above values in the wavelength range of 350 nm to 550 nm, even when the composition further includes the coloring component to form a layer, color correction may be performed while preventing a decrease in transmittance for visible light.

In the ethanol, the coloring component may have a maximum transmittance that is exhibited at a wavelength of 450 nm or more, 460 nm or more, 470 nm or more, or 480 nm or more, in a wavelength range of 350 nm to 550 nm at 25° C., and, in another example, may have a maximum transmittance that is exhibited at a wavelength of 550 nm or less, 540 nm or less, 530 nm or less, 520 nm or less, or 510 nm or less. Here, in the ethanol, the wavelength at which the maximum transmittance of the coloring component is exhibited may be within a range formed by appropriately selecting limits from among the upper and lower limits listed above. In the case in which the wavelength at which the maximum transmittance of the coloring component in the ethanol is exhibited satisfies the above range, when a layer is formed of the composition, the layer exhibits a blue-based color.

The coloring component may have a maximum transmittance of 85% or more, 86% or more, 87% or more, 88% or more, 89% or more, 90% or more, 91% or more, or 92% or more in the wavelength range of 350 nm to 550 nm at a temperature of 25° C. in the ethanol, and, in another example, may have a maximum transmittance of 99% or less, 98% or less, 97% or less, 96% or less, or 95% or less. Here, the maximum transmittance may be within a range formed by appropriately selecting limits from among the upper and lower limits listed above.

In the ethanol, the coloring component may have the shortest wavelength at which a transmittance of 50% is exhibited, among wavelengths of 600 nm or more at 25° C., at a wavelength of 650 nm or more, 675 nm or more, 700 nm or more, or 725 nm or more, and, in another example, the shortest wavelength may be a wavelength of 800 nm or less, 780 nm or less, or 760 nm or less. Here, in the ethanol, the shortest wavelength of the coloring component at which the transmittance of 50% is exhibited at the wavelength of 600 nm or more may be within a range formed by appropriately selecting limits from among the upper and lower limits listed above. In the case in which the shortest wavelength of the coloring component in the ethanol at which the transmittance of 50% is exhibited at the wavelength of 600 nm or more satisfies the above range, when a layer is formed of the composition, the layer exhibits a blue-based color.

In the ethanol, the coloring component may have an average transmittance of 90% or more, 91% or more, 92% or more, or 93% or more in a wavelength range of 900 nm to 2,400 nm at 25° C. When the average transmittance satisfies the above values in the wavelength range of 900 nm to 2,400 nm, color correction may be performed without affecting a photochromic effect of the phase change material contained in the composition.

The coloring component may include a pigment or a dyestuff. Here, the pigment refers to a coloring matter that is not dissolved in water and an organic solvent but is dispersed, and the dyestuff refers to a coloring material that is dissolved in water and an organic solvent. When the coloring component satisfies the above-described optical properties, the coloring component may include a pigment or a dyestuff. For example, phthalocyanine blue, which is an organic pigment, may be used as the coloring component, but the type of coloring component is not particularly limited.

The composition according to the example of the present disclosure may form a layer whose transmittance for light having a wavelength of 550 nm is 30% or more, 31% or more, 32% or more, or 33% or more, and an absolute value of ΔT2400 according to Formula 1 below may be 15% or more, 15.5% or more, 16% or more, 16.5% or more, or 17% or more. In this case, the transmittance of the layer formed of the composition may be a value measured when a thickness of the layer ranges from about 2 to 5 μm.

$$\Delta T2400 = T2400.L - T2400.H \quad \text{[Formula 1]}$$

In Formula 1, T2400.L denotes a transmittance of the layer for light having a wavelength of 2,400 nm at 25° C., and T2400.H denotes a transmittance of the layer for light having a wavelength of 2,400 nm at 85° C.

The composition according to the example of the present disclosure includes the above-described phase transition material and coloring component so that the transmittance and the thermochromic property in the visible light range may be secured at an excellent level.

The composition according to the example of the present disclosure may satisfy Formula 2 below.

$$50 \leq \Delta I \leq 1{,}000 \quad \text{[Formula 1]}$$

In Formula 2, ΔI denotes an absolute value of a difference between a maximum peak intensity of the phase transition material in XRD analysis and a maximum peak intensity of the composition in XRD analysis. In another example, a lower limit of the ΔI may be 60, 70, 80, 90, or 100, and an upper limit may be 950, 900, 850, or 800. Here, the ΔI may be within a range formed by appropriately selecting limits from among the upper and lower limits listed above.

The composition according to the example of the present disclosure may have a 2Θ value of 20° or more, 22° or more, 24° or more, or 26° or more, which denotes the maximum peak intensity in the XRD analysis, and, in another example, may have a 2Θ value of 40° or less, 37.5° or less, 35° or less, 32.5° or less, or 30° or less.

In the composition according to the example of the present disclosure, an absolute value of a difference between the 2Θ value which denotes a maximum peak intensity of the phase transition material in the XRD analysis and the 2Θ value which denotes a maximum peak intensity of the composition in the XRD analysis may be within a range of 0° to 1°. In another example, the absolute value of the difference between the 2Θ value which denotes the maximum peak intensity of the phase transition material in the XRD analysis and the 2Θ value which denotes the maximum peak intensity of the composition in the XRD analysis may be within a range of 0° to 0.75°, 0° to 0.5°, or 0° to 0.25°.

In the composition according to the example of the present disclosure, the maximum peak intensity in the XRD analysis may be 2,000 or more, 2,250 or more, 2,500 or more, 2,750 or more, or 3,000 or more, and, in another example, the maximum peak intensity in the XRD analysis may be 5,000 or less, 4,750 or less, 4,500 or less, 4,250 or less, or 4,000 or less. The maximum peak intensity in the XRD analysis may be within a range formed by appropriately selecting limits from among the upper and lower limits listed above.

Here, in the composition according to the example of the present disclosure, when the maximum peak intensity in the XRD analysis satisfies the above range, the coloring component may be contained in an amount of 3 parts by weight or more, 4 parts by weight or more, 5 parts by weight or more, or 6 parts by weight or more with respect to 100 parts by weight of the phase transition material, and, in another example, the coloring component may be contained in an amount of 24 parts by weight or less, 23 parts by weight or less, 22 parts by weight or less, 21 parts by weight or less, or 20 parts by weight or less with respect to 100 parts by weight of the phase transition material.

The phase transition material of the composition according to the example of the present disclosure may include a ground phase transition material. The ground phase transition material may refer to a material obtained by grinding a phase transition material precursor. The phase transition material precursor may refer to a phase transition material that is aggregated or has an average particle size greater than the average particle size of the vanadium dioxide (VO2) particles described above.

In the composition according to the example of the present disclosure containing the ground phase transition material, the maximum peak intensity in the XRD analysis may satisfy the above range. That is, in the composition containing the ground phase transition material, a maximum peak intensity in the XRD analysis may be 2,000 or more, 2,250 or more, 2,500 or more, 2,750 or more, or 3,000 or more, and, in another example, the maximum peak intensity in the XRD analysis may be 5,000 or less, 4,750 or less, 4,500 or less, 4,250 or less, or 4,000 or less.

The method of grinding the phase transition material precursor is not particularly limited, but, for example, milling equipment may be used. Further, more specifically, after precursor slurry is prepared using the phase transition material precursor, the precursor slurry is filled with metal beads to sufficiently grind the precursor slurry using the milling equipment, and then the metal beads are removed to prepare the ground slurry, and thus the phase transition material precursor may be ground.

The precursor slurry may include a phase transition material precursor and a polar solvent.

The phase transition material precursor may be contained in an amount of 5 wt % or more, 7.5 wt % or more, or 9 wt % or more with respect to a total weight of the precursor slurry, and, in another example, may be contained in an amount of 20 wt % or less, 15 wt % or less, or 12.5 wt % or less, but the content of the phase transition material precursor is not particularly limited as long as the phase transition material precursor is appropriately dispersed in the polar solvent.

In consideration of the compatibility of the polar solvent with the phase transition material precursor, the polar solvent may be contained in an amount of 2,000 parts by weight or less, 1,750 parts by weight or less, 1,500 parts by weight or less, or 1,250 parts by weight or less with respect to 100 parts by weight of the phase transition material precursor, and, in another example, may be contained in an amount of 500 parts by weight or more, 600 parts by weight or more, 700 parts by weight or more, or 800 parts by weight or more.

The polar solvent may be selected from the group consisting of water and alcohol compounds, and the alcohol compounds include, for example, methanol, ethanol, propanol, 2-butoxyethanol, isopropyl alcohol, and the like.

The metal beads are not particularly limited as long as they are beads are generally used in the art, and include, for example, zirconia beads or the like. Further, as long as the phase transition material precursor contained in the precursor slurry can be appropriately ground through milling, the content and size of the metal beads are not particularly limited.

Further, by adding and mixing a dispersion polymer and a polar solvent to the ground slurry, final ground phase transition slurry containing the ground phase transition material may be contained in the composition according to the example of the present disclosure.

The dispersion polymer may be a nonionic polymer having no physical and chemical correlation with the ground phase transition material contained in the ground slurry and may include, for example, at least one selected from the group consisting of polymethyl methacrylate (PMMA), polystyrene (PS), and polycaprolactone. (PCL), polyacrylonitrile (PAN), polyvinylidene fluoride (PVDF), polyvinylpyrrolidone (PVP), and polyvinyl alcohol (PVA), but is not particularly limited.

The content of the dispersion polymer in the final ground phase transition slurry is not particularly limited as long as the ground phase transition material contained in the ground slurry can be appropriately dispersed. The dispersion polymer in the final ground phase transition slurry may be contained in an amount of 0.1 parts by weight or more, 0.3 parts by weight or more, 0.5 parts by weight or more, 0.7 parts by weight or more, 0.9 parts by weight or more, or 1.2 parts by weight or more with respect to 100 parts by weight of the ground slurry, and, in another example, the dispersion polymer may be contained in an amount of 3 parts by weight or less, 2.7 parts by weight or less, 2.4 parts by weight or less, 2.1 parts by weight or less, or 1.8 parts by weight or less with respect to 100 parts by weight of the ground slurry. Here, the content of the dispersion polymer may be within a range formed by appropriately selecting limits from among the upper and lower limits listed above.

The content of the polar solvent added to prepare the final ground phase transition slurry is not particularly limited as long as the ground phase transition material contained in the ground slurry can be appropriately dispersed. The added polar solvent may be contained in an amount of 50 parts by weight or more, 60 parts by weight or more, 70 parts by weight or more, 80 parts by weight or more, or 90 parts by weight or more with respect to 100 parts by weight of the ground slurry, and, in another example, the added polar solvent may be contained in an amount of 200 parts by weight or less, 180 parts by weight or less, 160 parts by weight or less, 140 parts by weight or less, or 120 parts by weight or less with respect to 100 parts by weight of the ground slurry. Here, the content of the added polar solvent may be within a range formed by appropriately selecting limits from among the upper and lower limits listed above.

In the composition according to the example of the present disclosure, the maximum peak intensity in the XRD analysis may be greater than 5,000, 5,250 or more, 5,500 or more, 5,750 or more, or 6,000 or more, and, in another example, the maximum peak intensity in the XRD analysis may be 20,000 or less, 17,500 or less, 15,000 or less, 12,500 or less, or 10,000 or less. The maximum peak intensity in the XRD analysis may be within a range formed by appropriately selecting limits from among the upper and lower limits listed above.

Here, in the composition according to the example of the present disclosure, when the maximum peak intensity in the XRD analysis satisfies the above range, the coloring component may be contained in an amount of 0.1 parts by weight or more, 0.5 parts by weight or more, 1 parts by weight or more, 1.25 parts by weight or more, 1.5 parts by weight or more, 1.75 parts by weight or more, or 2 parts by weight or more with respect to 100 parts by weight of the phase transition material, and, in another example, the coloring component may be contained in an amount of 35 parts by weight or less, 34 parts by weight or less, 33 parts by weight or less, 32 parts by weight or less, 31 parts by weight or less, or 30 parts by weight or less with respect to 100 parts by weight of the phase transition material.

The phase transition material of the composition according to the example of the present disclosure may include a hydrothermal synthesis phase transition material. The hydrothermal synthesis phase transition material may refer to a material obtained by synthesizing a hydrothermal synthesis precursor using a hydrothermal synthesis method. The hydrothermal synthesis phase transition material is not particularly limited as long as it is capable of synthesizing a compound that satisfies the characteristics of the phase transition material described above using the hydrothermal synthesis method, but may be formed by, for example, hydrothermal synthesis by mixing ammonium metavanadate and hydrazine hydrate at an appropriate ratio. The hydrothermal synthesis method may be performed using hydrothermal synthesis equipment or the like.

In the composition according to the example of the present disclosure containing the hydrothermal synthesis phase transition material, the maximum peak intensity in the XRD analysis may satisfy the above range. That is, in the composition containing the hydrothermal synthesis phase transition material, the maximum peak intensity in the XRD analysis may be greater than 5,000, 5,250 or more, 5,500 or more, 5,750 or more, or 6,000 or more, and, in another example, the maximum peak intensity in the XRD analysis may be 20,000 or less, 17,500 or less, 15,000 or less, 12,500 or less, or 10,000 or less.

Further, by adding and mixing a dispersion polymer and a polar solvent to the hydrothermal synthesis phase transition material, the final hydrothermal synthesis phase transition slurry containing the hydrothermal synthesis phase transition material may be contained in the composition according to the example of the present disclosure.

Since the dispersion polymer and the polar solvent, which are contained in the final hydrothermal synthesis phase transition slurry, are identical to the dispersion polymer and the polar solvent, which are described in the above-described final ground phase transition slurry, detailed content thereof will be omitted.

In the composition according to the example of the present disclosure, in the case in which the maximum peak intensity in the XRD analysis satisfies each of the above ranges and the content of the coloring component in the composition satisfies each of the above ranges, when a layer is formed of the composition, the layer exhibits a blue-based color so that excellent aesthetics may be secured and high visible light transmittance and excellent thermochromic properties may be obtained. When the content of the coloring component in the composition does not satisfy the above range, it is difficult to secure the blue-based color as well as the high visible light transmittance. Further, when the content of the coloring component in the composition exceeds the above range, it is difficult to secure the high visible light transmittance and thermochromic property.

In the composition according to the example of the present disclosure, the maximum peak intensity in the XRD analysis may be 2,000 or more, 2,250 or more, 2,500 or more, 2,750 or more, or 3,000 or more, and, in another example, the maximum peak intensity in the XRD analysis may be 20,000 or less, 17,500 or less, 15,000 or less, 12,500 or less, or 10,000 or less. Here, the maximum peak intensity in the XRD analysis may be within a range formed by appropriately selecting limits from among the upper and lower limits listed above.

In the composition according to the example of the present disclosure, Δλcut in Formula 3 below may satisfy 10 nm or more, 12.5 nm or more, 15 nm or more, 20 nm or more, 30 nm or more, or 40 nm or more.

$$\Delta\lambda cut = \lambda cut.25 - \lambda cut.85 \quad [\text{Formula 3}]$$

In Formula 3, λcut.25 denotes the shortest wavelength at which the layer formed of the composition exhibits a transmittance of 50% at a wavelength of 600 nm or more at 25° C., and λcut.85 denotes the shortest wavelength at which the layer formed of the composition exhibits a transmittance of 50% at the wavelength of 600 nm or more at 85° C.

In the composition according to the example of the present disclosure, ΔT in Formula 4 below may satisfy 15% or more, 16% or more, 17% or more, 18% or more, or 19% or more.

$$\Delta T = T25 - T85 \quad [\text{Formula 4}]$$

In Formula 4, T25 denotes an average transmittance of the layer formed of the composition in a wavelength range of λcut to 2,400 nm at 25° C., T85 denotes an average transmittance of the layer formed of the composition in the wavelength range of λcut to 2,400 nm at 85° C., and λcut denotes the shortest wavelength at which the layer formed of the composition exhibits a transmittance of 50% in a wavelength range of 600 nm to 1,000 nm at a corresponding temperature.

In the composition according to the example of the present disclosure, when the Δλcut in Formula 3 and/or the ΔT in Formula 4 satisfy the above ranges, a layer having high visible light transmittance and an excellent thermochromic property may be formed.

Figure 2:

FIGS. 1 and 2 illustrate laminates 10 and 20 according to an example of the present disclosure. The laminate 10 according to the example of the present disclosure may have a structure in which a base material layer 110 and a phase transition layer 120 are included as illustrated in FIG. 1, and the laminate 20 according to another example of the present disclosure may have a structure in which a base material layer 110, a phase transition layer 120, and a protective layer 130 are included as illustrated in FIG. 2.

Each of the laminates 10 and 20 according to the examples of the present disclosure may include a base material layer 110 and a phase transition layer 120 formed on one or both surfaces of the base material layer. In FIGS. 1 and 2, the laminates 10 and 20 are illustrated as including the phase transition layer 120 formed on one surface of the base material layer 110, but this is only exemplary. Although not illustrated in the drawings, each of the laminates according to the examples of the present disclosure may include phase transition layers formed on both surfaces of the base material layer.

The base material layer 110 is a support for each of the laminates 10 and 20 and may have visible light transmittance and/or transparency. In order to have such properties, the base material layer 110 may use a material having visible light transmittance and/or transparency.

The base material layer 110 may include, for example, at least one selected from the group consisting of a cyclic olefin resin, a polyimide resin, a polycarbonate resin, a polyamide resin, a polyalkylene terephthalate resin (e.g., a polyethylene terephthalate resin and a polybutylene terephthalate resin), an acrylic resin, and an epoxy resin, but the present disclosure is not limited thereto.

Further, the base material layer 110 may be formed by melt molding or casting molding and may be coated with a coating agent, such as an antireflection agent, a hard coating agent, or an antistatic agent, after the molding, as necessary. Specifically, the base material layer may be formed by molding pellets, which are obtained from the material having the visible light transmittance and/or transparency, using melt molding such as injection molding, melt extrusion molding, blow molding, etc., or the base material layer 110 may be formed by a method in which a material having the visible light transmittance and/or transparency is casted on a suitable substrate to cure and dry.

The laminates 10 and 20 may include the base material layer 110 having visible light transmittance and/or transparency so that the laminates 10 and 20 may have an overall bright color and may secure excellent optical properties such as transmittance for visible light.

The phase transition layer 120 may be a layer formed of the composition according to the example of the present disclosure described above. The phase transition layer 120 may be formed by applying the composition on one or both surfaces of the base material layer.

The type of method of applying the composition is not particularly limited, and various known methods may be used. For example, the method of applying the composition, which may be used in the present disclosure, may include roll coating, gravure coating, reverse coating, roll brushing, spray coating, air knife coating, extrusion coating by a die coater, etc., and the composition may be injected using a blade. In consideration of mass production, a roll-to-roll process may be used.

The type of drying method is not particularly limited as long as the applied composition prevents deformation of the base material layer 110 and sufficiently volatilizes a solvent in the composition, and for example, various known methods such as hot air drying, cold air drying, hot wire heating drying, boiler heating drying, and the like may be used.

In order to secure high visible light transmittance and an excellent thermochromic property and to exhibit a blue-based color which is a general window color, the phase transition layer 120 may have a dry thickness of 0.001 times or more, 0.005 times or more, 0.01 times or more, 0.015 times or more, 0.02 times or more, or 0.025 times or more with respect to a thickness of the base material layer 110, and, in another example, may have a dry thickness of 1 times or less, 0.5 times or less, 0.1 times or less, or 0.75 times or less with respect to the thickness of the base material layer 110.

The laminate 10 according to the example of the present disclosure may form a layer whose transmittance for light having a wavelength of 550 nm is 30% or more, 31% or more, 32% or more, or 33% or more, and an absolute value of ΔT2400 according to Formula 1 below may be 15% or more, 15.5% or more, 16% or more, 16.5% or more, or 17% or more. In this case, the transmittance of the laminate 10 may be a value measured when a thickness of the laminate 10 ranges from about 70 to 80 µm.

$$\Delta T2400=T2400.L-T2400.H \quad \text{[Formula 1]}$$

In Formula 1, T2400.L denotes a transmittance of the layer for light having a wavelength of 2,400 nm at 25° C., and T2400.H denotes a transmittance of the layer for the light having the wavelength of 2,400 nm at 85° C.

The laminate 10 according to the example of the present disclosure may exhibit a blue-based color, which is a general window color, which is aesthetically excellent, and may have high visible light transmittance and an excellent thermochromic property due to the phase transition layer formed of the composition according to the example of the present disclosure described above.

The laminate 20 according to the example of the present disclosure may further include a protective layer 130. The protective layer 130 may be formed on the phase transition layer 120. In another example, the laminate 20 may be formed on the outermost side of the protective layer 130.

The laminate 20 including the protective layer 130 may allow the visible light transmittance and the thermochromic property to be improved, prevent the phase transition material in the phase transition layer 120 from being oxidized by air to improve durability, and allow a color exhibited in color correction through the coloring component to be lightened so that a natural and comfortable blue-based color may be exhibited.

In consideration of the above effects, the protective layer 130 may have a thickness of 3 times or more, 4 times or more, or 5 times or more with respect to the thickness of the phase transition layer 120, and, in another example, the protective layer 130 may have a thickness of 30 times or less, 28 times or less, or 26 times or less with respect to the thickness of the phase transition layer 120.

The protective layer 130 may be formed by applying and curing protective ink on the phase transition layer 120.

The protective ink may include a curable resin, and the curable resin is not particularly limited as long as it is cured by irradiation with active energy rays but, for example, an acrylic resin or a urethane resin containing a polyol and an isocyanate compound is suitable. Specifically, polyurethane acrylate, etc. may be used as the curable resin, and the curable resin may be formed by, for example, selecting one selected from the group consisting of a urethane acrylate oligomer, an acrylate, and mixtures thereof (e.g., urethane acrylate oligomer, and methyl (meth) acrylate as a monomer.

Further, the protective ink may further include a photoinitiator for curing by the active energy rays. Here, the photoinitiator refers to a material that absorbs the energy of the active energy rays to start a polymerization reaction, and a known suitable photoinitiator such as Irgacure 184D or the like may be used.

The protective ink may further include metal oxide particles in order to block ultraviolet rays and preserve visible light transmittance. The metal oxide particles may include at least one selected from the group consisting of titanium oxide, zinc oxide, zirconium oxide, and iron oxide.

The type of method of applying the protective ink is not particularly limited, and various known methods may be used. For example, the method of applying the protective ink, which may be used in the present disclosure, may include roll coating, gravure coating, reverse coating, roll brushing, spray coating, air knife coating, and extrusion coating by a die coater, etc., and the protective ink may be injected using a blade. In consideration of mass production, a roll-to-roll process may be used.

The method of curing the protective ink is not particularly limited, but it may be appropriate to form the protective layer 130 by curing with active energy rays. When the protective layer 130 is formed by curing the active energy rays, damage to the base material layer 110 and the phase transition layer 120 may be prevented. In this case, the active energy rays may be ultraviolet light, which is light in a wavelength range of 100 to 380 nm.

In the laminate 20 according to the example of the present disclosure, a transmittance for light having a wavelength of 550 nm may be 45% or more, 50% or more, or 55% or more, and an absolute value of ΔT2400 according to Formula 1 below may be 15% or more, 16% or more, 17% or more, 18% or more, or 19% or more. In this case, the transmittance of the laminate 20 may be a value measured when a thickness of the laminate 20 ranges from about 100 to 150 µm.

$$\Delta T2400=T2400.L-T2400.H \quad \text{[Formula 1]}$$

In Formula 1, T2400.L denotes a transmittance of the layer for light having a wavelength of 2,400 nm at 25° C., and T2400.H denotes a transmittance of the layer for the light having the wavelength of 2,400 nm at 85° C.

Since the laminate 20 according to the example of the present disclosure includes the protective layer 130, the laminate 20 may allow visible light transmittance and the thermochromic property to be improved, prevent the phase transition material in the phase transition layer 120 from being oxidized by air to improve durability, and allow a color exhibited in color correction through the coloring component to be lightened so that a natural and comfortable blue-based color may be exhibited.

A window according to an example of the present disclosure may include a glass layer, and a phase transition layer which is formed on one or both surfaces of the glass layer and formed of the composition according to the example of the present disclosure described above.

Further, the window according to the example of the present disclosure may include a glass layer, and a laminate which is formed on one or both surfaces of the glass layer and formed of the composition according to the example of the present disclosure described above.

Further, the window may be used as a smart window. Here, the smart window refers to a window capable of blocking infrared rays that increase an indoor temperature in summer and allowing the infrared rays to pass therethrough in winter. As described above, the window according to the example of the present disclosure may use energy efficiently.

Hereinafter, the present disclosure will be described with reference to examples and comparative examples, but the scope of the present disclosure is not limited due to the content described below.

Preparation Example 1-Preparation of Ground Phase Transition Material

Commercial vanadium dioxide (VO2) powder (supplier: FUNCMATER Co. Ltd, average particle size: 200 to 300 nm, monoclinic) was ground using milling equipment (supplier: Dntek Co. Ltd, twin nanoset-mill, model name: TNS050).

Specifically, the commercial vanadium dioxide (VO2) powder and isopropyl alcohol (IPA) were mixed at a weight ratio of 1:9 (VO2:IPA) so as to be sufficiently dispersed to form a precursor slurry. Thereafter, zirconia beads having an average diameter of 0.1 mm and the precursor slurry were mixed at a weight ratio of 1:4 (zirconia beads:precursor slurry) to fill the zirconia beads, and then rotated in a range of 4,000 to 4,500 rpm for 180 minutes to grind the vanadium dioxide (VO2) powder in the precursor slurry. The above rotation and grinding process was repeated about 70 times, and the filled zirconia beads were removed to obtain a ground slurry.

The ground slurry, polyvinylpyrrolidone (PVP) (supplier: Sigma-Aldrich Co. Ltd), and IPA were mixed at a weight ratio of 500:7.5:492.5 (ground slurry:PVP:IPA), and a final ground phase transition slurry was prepared so that vanadium dioxide (VO2) particles were 5 wt % with respect to a total weight. The final ground phase transition slurry was also subjected to sonication using a sonicator to improve the dispersibility of the vanadium dioxide (VO2) particles in the slurry.

Preparation Example 2-Preparation of Hydrothermal Synthesis Phase Transition Material Ammonium metavanadate (NH4VO3), hydrazine monohydrate (N2H4H2O), and distilled water (D.I. water) were mixed at a weight ratio of 10:5:85 (NH4VO3:N2H4H2O:D.I. water) so as to be sufficiently dispersed to form a vanadium dioxide (VO2) hydrothermal synthesis precursor. The vanadium dioxide (VO2) hydrothermal synthesis precursor was formed by obtaining powder-type vanadium dioxide (VO2) particles having a particle size of about 50 to 100 μm using hydrothermal synthesis equipment (supplier: Hanul Engineering Co. Ltd, model name: HR-8300).

The obtained vanadium dioxide (VO2) particles, PVP (supplier: Sigma-Aldrich Co. Ltd), and IPA were mixed at a weight ratio of 5:0.75:94.25 (VO2 particles:PVP:IPA) to obtain a final hydrothermal synthesis phase transition slurry. The final hydrothermal synthesis phase transition slurry was also subjected to sonication using a sonicator to improve the dispersibility of the vanadium dioxide (VO2) particles.

Example 1

(1) Composition Preparation

Figure 3:
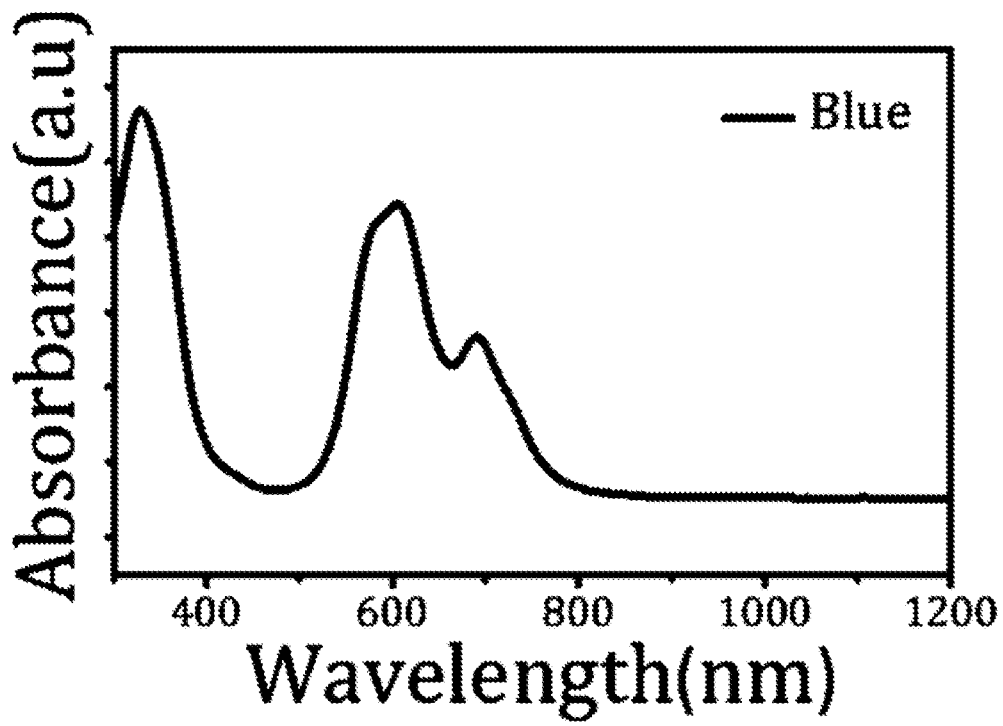
FIG. 3 illustrates an absorbance spectrum of a coloring component according to an example of the present disclosure.
Figure 4:
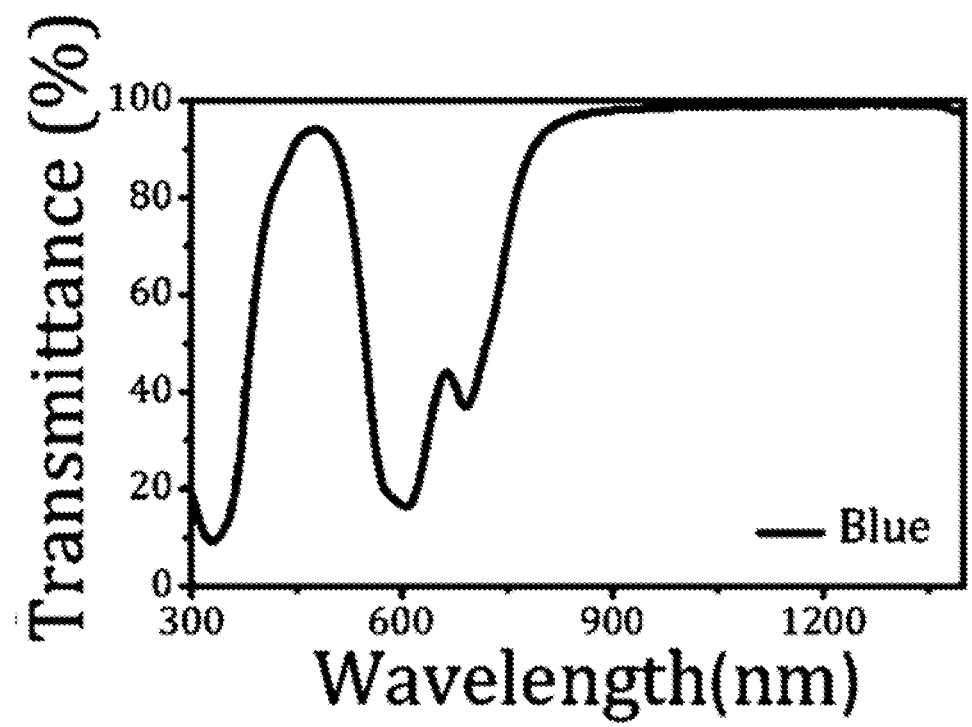
FIG. 4 illustrates a transmittance spectrum of a coloring component according to an example of the present disclosure.

As a coloring component, phthalocyanine blue (supplier: CFC Terramate Co. Ltd, molecular weight: 576.1 g/mol) dispersed in ethanol, which is one of the organic pigments, was used. The phthalocyanine blue dispersed in the ethanol was in a state in which the ethanol and the phthalocyanine blue were mixed at a weight ratio of 90:10 (ethanol:phthalocyanine blue) (a concentration of phthalocyanine blue: 10 wt %). FIG. 3 illustrates an absorbance spectrum of the phthalocyanine blue, and FIG. 4 illustrates a transmittance spectrum of the phthalocyanine blue.

A final ground phase transition slurry V1 obtained in Preparation Example 1 above and a phthalocyanine blue B dispersed in the ethanol were mixed at a weight ratio of 97:3 (V1:B) to form a composition so that the phthalocyanine blue in the mixed solution has a concentration of 0.3 wt %. The composition was also subjected to sonication using a sonicator to improve the dispersibility of the vanadium dioxide (VO2) particles and the phthalocyanine blue.

(2) Laminate Preparation

As a base material layer, a polyethylene terephthalate (PET) resin coating film having a width of 15 cm, a length of 30 cm, and a thickness of 75 μm was used. The prepared composition was coated on one surface of the PET resin coating film using a doctor blade. The coating of the composition was performed at a rotational speed of 4 rpm so that a thickness thereof became 50 μm.

Thereafter, a solvent in the composition was sufficiently volatilized by hot air at 100° C., a phase transition layer having a dry thickness of about 2 to 5 μm was formed, and thus a laminate including the base material layer and the phase transition layer was prepared.

Protective ink was applied on the formed phase transition layer using a doctor blade. In this case, the protective ink was formed by mixing 100 parts by weight of a urethane acrylate oligomer (supplier: Miwon Corporation, product name: Miramer PU210, weight average molecular weight: 5,000 mol/g, PDI: 1.2), which is a curable resin, and 10 parts by weight of Irgacure 184D (supplier: CIBA GEIGY Co. Ltd), which is a photoinitiator.

Thereafter, the protective ink was cured by emitting light having a wavelength of about 250 nm for 300 seconds using a 1.2 kW mercury lamp to form a protective layer having a thickness of 40 μm.

Accordingly, a laminate including the base material layer and the phase transition layer, and a laminate including the base material layer, the phase transition layer, and the protective layer were prepared.

Example 2

The final ground phase transition slurry V1 obtained in Preparation Example 1 above and the phthalocyanine blue B dispersed in the ethanol were mixed at a weight ratio of 95:5 (V1:B), and a composition and a laminate were prepared in the same manner as in Example 1 above except that the composition was prepared so that a concentration of the phthalocyanine blue in the mixed solution was 0.5 wt %.

Example 3

The final ground phase transition slurry V1 obtained in Preparation Example 1 above and the phthalocyanine blue B dispersed in the ethanol were mixed at a weight ratio of 93:7 (V1:B), and a composition and a laminate were prepared in the same manner as in Example 1 above except that the composition was prepared so that a concentration of the phthalocyanine blue in the mixed solution was 0.7 wt %.

Example 4

The final ground phase transition slurry V1 obtained in Preparation Example 1 above and the phthalocyanine blue B dispersed in the ethanol were mixed at a weight ratio of 91:9 (V1:B), and a composition and a laminate were prepared in the same manner as in Example 1 above except that the composition was prepared so that a concentration of the phthalocyanine blue in the mixed solution was 0.9 wt %.

Example 5

A final hydrothermal synthesis phase transition slurry V2 obtained in Preparation Example 2 above and the phthalocyanine blue B dispersed in the ethanol were mixed at a weight ratio of 99:1 (V2:B), and a composition and a laminate were prepared in the same manner as in Example 1 above except that the composition was prepared so that a concentration of the phthalocyanine blue in the mixed solution was 0.1 wt %.

Example 6

The final hydrothermal synthesis phase transition slurry V2 obtained in Preparation Example 2 above and the phthalocyanine blue B dispersed in the ethanol were mixed at a weight ratio of 97:3 (V2:B), and a composition and a laminate were prepared in the same manner as in Example 1 above except that the composition was prepared so that a concentration of the phthalocyanine blue in the mixed solution was 0.3 wt %.

Example 7

The final hydrothermal synthesis phase transition slurry V2 obtained in Preparation Example 2 above and the phthalocyanine blue B dispersed in the ethanol were mixed at a weight ratio of 95:5 (V2:B), and a composition and a laminate were prepared in the same manner as in Example 1 above except that the composition was prepared so that a concentration of the phthalocyanine blue in the mixed solution was 0.5 wt %.

Example 8

The final hydrothermal synthesis phase transition slurry V2 obtained in Preparation Example 2 above and the phthalocyanine blue B dispersed in the ethanol were mixed at a weight ratio of 93:7 (V2:B), and a composition and a laminate were prepared in the same manner as in Example 1 above except that the composition was prepared so that a concentration of the phthalocyanine blue in the mixed solution was 0.7 wt %.

Example 9

The final hydrothermal synthesis phase transition slurry V2 obtained in Preparation Example 2 above and the phthalocyanine blue B dispersed in the ethanol were mixed at a weight ratio of 91:9 (V2:B), and a composition and a laminate were prepared in the same manner as in Example 1 above except that the composition was prepared so that a concentration of the phthalocyanine blue in the mixed solution was 0.9 wt %.

Example 10

The final hydrothermal synthesis phase transition slurry V2 obtained in Preparation Example 2 above and the phthalocyanine blue B dispersed in the ethanol were mixed at a weight ratio of 89:11 (V2:B), and a composition and a laminate were prepared in the same manner as in Example 1 above except that the composition was prepared so that a concentration of the phthalocyanine blue in the mixed solution was 1.1 wt %.

Example 11

The final hydrothermal synthesis phase transition slurry V2 obtained in Preparation Example 2 above and the phthalocyanine blue B dispersed in the ethanol were mixed at a weight ratio of 87:13 (V2:B), and a composition and a laminate were prepared in the same manner as in Example 1 above except that the composition was prepared so that a concentration of the phthalocyanine blue in the mixed solution was 1.3 wt %.

Comparative Example 1

The final ground phase transition slurry obtained in Preparation Example 1 was applied on one surface of the PET resin coating film having a width of 15 cm, a length of 30 cm, and a thickness of 75 μm using a doctor blade. The coating of the final ground phase transition slurry was performed at a rotational speed of 4 rpm so that a thickness thereof became 50 μm.

Thereafter, a solvent in the final ground phase transition slurry was sufficiently volatilized by hot air at 100° C., and a phase transition layer having a dry thickness of about 2 to 5 μm was formed.

Protective ink was applied on the formed phase transition layer using a doctor blade. In this case, the protective ink was formed by mixing 100 parts by weight of a urethane acrylate oligomer (supplier: Miwon Corporation, product name: Miramer PU210, weight average molecular weight: 5,000 mol/g, PDI: 1.2), which is a curable resin, and 10 parts by weight of Irgacure 184D (supplier: CIBA GEIGY Co. Ltd), which is a photoinitiator.

Thereafter, the protective ink was cured by emitting light having a wavelength of about 250 nm for 300 seconds with a 1.2 kW mercury lamp so that a laminate further including a base material layer, a phase transition layer, and a protective layer was prepared.

Comparative Example 2

The final ground phase transition slurry V1 obtained in Preparation Example 1 above and the phthalocyanine blue B dispersed in the ethanol were mixed at a weight ratio of 99:1 (V1:B), and a composition and a laminate were prepared in the same manner as in Example 1 above except that the composition was prepared so that a concentration of the phthalocyanine blue in the mixed solution was 0.1 wt %.

Comparative Example 3

The final ground phase transition slurry V1 obtained in Preparation Example 1 above and the phthalocyanine blue B dispersed in the ethanol were mixed at a weight ratio of 89:11 (V1:B), and a composition and a laminate were prepared in the same manner as in Example 1 above except that the composition was prepared so that a concentration of the phthalocyanine blue was 1.1 wt %.

Comparative Example 4

A laminate was prepared in the same manner as in Comparative Example 1 above except that the final hydrothermal synthesis phase transition slurry V2 obtained in Preparation Example 2 was used instead of the final ground phase transition slurry V1 obtained in Preparation Example 1 above.

Comparative Example 5

The final hydrothermal synthesis phase transition slurry V2 obtained in Preparation Example 2 above and the phthalocyanine blue B dispersed in the ethanol were mixed at a weight ratio of 85:15 (V2:B), and a composition and a laminate were prepared in the same manner as in Example 1 above except that the composition was prepared so that a concentration of the phthalocyanine blue was 1.5 wt %.

<Physical Property Measurement Method and Measurement Results>

(1) XRD Analysis

Each of the compositions prepared in Examples 1 to 11 and Comparative Examples 1 to 5 above was applied drop by drop on one surface of a cover glass having a width of 2 cm and a length of 2 cm, and dried at 60° C. When each of the compositions was dried, the prepared composition was again applied drop by drop and dried at 60° C. so that XRD analysis samples were prepared.

Each of the XRD analysis samples was analyzed using Bruker AXS D8 Discover XRD (voltage: 50 kV, current: 1,000 μA Cu Kα radiation wavelength of: 1.54 Å) which is an X-ray diffraction analyzer. X-, y-, z-drives were appropriately moved so that a laser beam of the XRD analyzer was emitted to the XRD analysis sample, and measurements were performed from 10° to 90° at a 2° scan rate per minute using a coupled theta-2theta measurement mode.

Here, a maximum peak intensity at a peak corresponding to a [001] direction among main peaks was measured as a peak intensity according to a result in the XRD analysis of the present disclosure, and a 2Θ value at this time was measured.

(2) Method of Measuring Transmittance in Visible Light Range

A laminate including a base material layer and a phase transition layer immediately after production was placed in an environment without external light, and UV-VIS-NIR spectrometer equipment (supplier: Jasco Co. Ltd, model name: V-670) was used to measure transmittance for visible light at 25° C. Specifically, light having a wavelength of 550 nm was transmitted through the laminate using the UV-VIS-NIR spectrometer equipment, and an amount of light reduced due to a difference between an amount of light before the transmission and an amount of light after the transmission was measured. The reduced amount of the light was converted into transmittance using a light extinction method, and, in this case, the converted transmittance was measured as transmittance $T_{550}$ in the visible light range.

(3) Method of Measuring Difference in Transmittance Due to Phase Transition in Infrared Ray Region A laminate including a base material layer and a phase transition layer immediately after production was placed in the environment without external light, and UV-VIS-NIR spectrometer equipment (supplier: Jasco Co. Ltd, model name: V-670) was used to measure transmittance for light having a wavelength of 2,400 nm. Specifically, light having a wavelength of 2,400 nm was transmitted through the laminate using the UV-VIS-NIR spectrometer equipment, and an amount of light reduced due to a difference between an amount of light before the transmission and an amount of light after the transmission was measured. The reduced amount of light was converted into transmittance using a light extinction method, and, in this case, the converted transmittance was measured as transmittance for light having a wavelength of 2,400 nm. Here, the transmittance T2400.L for the light was measured at 25° C., the transmittance T2400.H for the light was measured at 85° C., and an absolute value of a difference value $\Delta T_{2400}$ therebetween was calculated.

(4) Method of Evaluating Color of Laminate

A laminate including a base material layer, a phase transition layer, and a protective layer immediately after production was placed in natural light and evaluated visually according to the following criteria.

PASS: a color of the laminate is not an inherent color of the phase transition material and appears as a color in a range from yellowish green to blue.

NG: the color of the laminate is an inherent color of the phase transition material or appears as a color similar thereto (for example, dull brown or yellow).

Physical properties measured in the above examples and comparative examples are as shown in Table 1 below.

TABLE 1

| Category | Peak Intensity | 2Θ | $T_{550}$ (%) | $\Delta T_{2400}$ | Color Evaluation |
|---|---|---|---|---|---|
| Example 1 | 3,839 | 27.9° | 35 | 21.29 | PASS |
| Example 2 | 3,537 | 27.94° | 37 | 19.25 | PASS |
| Example 3 | 3,451 | 27.92° | 37 | 19.18 | PASS |
| Example 4 | 3,471 | 27.86° | 35 | 17.15 | PASS |
| Example 5 | 9,348 | 27.88° | 39 | 30.08 | PASS |
| Example 6 | 9,296 | 27.98° | 40 | 29.85 | PASS |
| Example 7 | 9,175 | 27.94° | 42 | 29.1 | PASS |
| Example 8 | 9,005 | 27.94° | 42 | 27.88 | PASS |
| Example 9 | 8,876 | 27.92° | 44 | 26.52 | PASS |
| Example 10 | 6,342 | 27.90° | 37 | 21.43 | PASS |
| Example 11 | 6,159 | 27.92° | 33 | 17.48 | PASS |
| Comparative Example 1 | 3,716 | 27.82° | 24 | 23 | NG |
| Comparative Example 2 | 3,595 | 27.82° | 29 | 22.12 | NG |
| Comparative Example 3 | 3,049 | 27.88° | 26 | 12.9 | PASS |
| Comparative Example 4 | 9,605 | 27.96° | 25 | 30.3 | NG |
| Comparative Example 5 | 6,048 | 27.94° | 29 | 14.28 | PASS |

Referring to Table 1, in Examples 1 to 11, all of the transmittances T550 for the light having the wavelength of 550 nm at 25° C. were 30% or more, and the absolute value of the difference in transmittance ΔT2400 due to the phase transition in the infrared ray range was 15% or more. Further, in Examples 1 to 10, all of the colors appeared as color in a range from yellowish green to blue in the evaluation of the color of the laminate and thus were evaluated as "PASS."

On the other hand, in Comparative Examples 1 to 5, all of the transmittances T550 for the light having the wavelength of 550 nm at 25° C. did not reach 30%, and in Comparative Examples 3 and 5, the absolute value of the difference in transmittance ΔT2400 due to the phase transition in the infrared ray range did not reach 15%. Further, in Comparative Examples 1, 2 and 4, the colors exhibited an inherent color of the phase transition material or a color similar thereto in the evaluation of the color of the laminate and thus were evaluated as "NG."

According to the present disclosure, it is possible to provide a composition through which a laminate which is aesthetically excellent is formed by exhibiting a blue-based color, which is a general window color.

Further, according to the present disclosure, it is possible to provide a composition through which a laminate having high visible light transmittance and an excellent thermochromic property is formed while enabling mass production.

Further, according to the present disclosure, it is possible to provide a laminate formed through the above composition and a window including the laminate.

What is claimed is:

1. A composition comprising:
   a phase transition material; and
   a coloring component,
   wherein the phase transition material is vanadium dioxide particle,
   wherein the coloring component exhibits the maximum absorption peak within a wavelength range from 250 nm to 400 nm in ethanol at 25° C.,
   wherein the Δλ of the coloring component according to the Formula 7 below is from 100 nm to 200 nm,
   wherein the coloring component exhibits an absorption peak in a wavelength range from 500 nm to 800 nm in ethanol at 25° C., wherein the composition exhibits a maximum peak intensity within a range from 2,000 to 20,000 in the XRD analysis, and wherein the composition is formulated to form a layer whose transmittance for light having a wavelength of 550 nm is 30% or more and whose absolute value of $\Delta T_{2400}$ according to Formula 1 below is 15% or more:

$$\Delta T_{2400} = T_{2400.L} - T_{2400.H} \quad \text{[Formula 1]}$$

wherein, in Formula 1, $T_{2400.L}$ denotes a transmittance of the layer for light having a wavelength of 2,400 nm at 25° C., and $T_{2400.H}$ denotes a transmittance of the layer for the light having the wavelength of 2,400 nm at 85° C.:

$$\Delta\lambda = \lambda L - \lambda S \quad \text{[Formula 7]}$$

wherein, in Formula 7, λL denotes the longest wavelength at which the coloring component in ethanol exhibits a transmittance of 50% within a wavelength range from 300 nm to 600 nm at 25° C., and λS denotes the shortest wavelength at which the coloring component in ethanol exhibits a transmittance of 50% within the wavelength range of 300 nm to 600 nm at 25° C.

2. The composition of claim 1, wherein the composition satisfies Formula 2 below:

$$50 < \Delta I < 1,000 \quad \text{[Formula 2]}$$

wherein, in Formula 2, ΔI denotes an absolute value of a difference between a maximum peak intensity of the phase transition material in X-ray diffraction (XRD) analysis and a maximum peak intensity of the composition in XRD analysis.

3. The composition of claim 1, wherein a 2Θ value which denotes a maximum peak intensity of the composition in XRD analysis is in a range of 20° to 40°.

4. The composition of claim 1, wherein the composition exhibits the maximum peak intensity in the XRD analysis within a range of 2,000 to 5,000, and wherein the coloring component is contained in an amount of 3 to 24 parts by weight with respect to 100 parts by weight of the phase transition material.

5. The composition of claim 1, wherein the composition exhibits the maximum peak intensity in the XRD analysis within a range of greater than 5,000 and less than or equal to 20,000, and wherein the coloring component is contained in an amount of 0.1 to 35 parts by weight with respect to 100 parts by weight of the phase transition material.

6. The composition of claim 1, wherein $\Delta\lambda_{cut}$ in Formula 3 below is 10 nm or more:

$$\Delta\lambda_{cut} = \lambda_{cut.25} - \lambda_{cut.85} \quad \text{[Formula 3]}$$

wherein in Formula 3, $\Delta_{cut.25}$ denotes the shortest wavelength at which the layer formed of the composition exhibits a transmittance of 50% at a wavelength of 600 nm or more at 25° C., and $\lambda_{cut.85}$ denotes the shortest wavelength at which the layer formed of the composition exhibits a transmittance of 50% at the wavelength of 600 nm or more at 85° C.

7. The composition of claim 1, wherein ΔT in Formula 4 below is 15% or more:

$$\Delta T = T_{25} - T_{85} \quad \text{[Formula 4]}$$

wherein, in Formula 4, $T_{25}$ denotes an average transmittance of the layer formed of the composition in a wavelength range of $\lambda_{cut}$ to 2,400 nm at 25° C., $T_{85}$ denotes an average transmittance of the layer formed of the composition in the wavelength range of $\lambda_{cut}$ to 2,400 nm at 85° C., and $\lambda_{cut}$ denotes the shortest wavelength at which the layer formed of the composition exhibits a transmittance of 50% in a wavelength range of 600 nm to 1,000 nm at a corresponding temperature.

8. The composition of claim 1, wherein the phase transition material has a $\Delta\lambda_{cut.v}$ of 10 nm or more in Formula 5below:

$$\Delta\lambda_{cut.v} = \lambda_{cut.v.25} - \lambda_{cut.v.85} \quad \text{[Formula 5]}$$

wherein, in Formula 5, $\lambda_{cut.v.25}$ denotes the shortest wavelength at which the phase transition material in isopropyl alcohol exhibits a transmittance of 50% at a wavelength of 600 nm or more at 25° C., and $\lambda_{cut.v.85}$ denotes the shortest wavelength at which the phase transition material in the isopropyl alcohol exhibits a transmittance of 50% at the wavelength of 600 nm or more at 85° C.

9. The composition of claim 1, wherein the phase transition material has a $\Delta T_v$ of 15% or more in Formula 6 below:

$$\Delta T_v = T_{v25} - T_{v85} \quad \text{[Formula 6]}$$

wherein, in Formula 6, $T_{v25}$ denotes an average transmittance of the phase transition material in isopropyl alcohol in a wavelength range of $\lambda_{cut}$ to 2,400 nm at 25° C., $T_{v85}$ denotes an average transmittance of the phase transition material in the isopropyl alcohol in the wavelength range of $\lambda_{cut}$ to 2,400 nm at 85° C., and $\lambda_{cut}$ denotes the shortest wavelength at which the phase transition material in the isopropyl alcohol exhibits a transmittance of 50% in a wavelength range of 600 nm to 1,000 nm at a corresponding temperature.

10. The composition of claim 1, wherein, in ethanol, the coloring component has an average transmittance of 50% or more in a wavelength range of 350 nm to 550 nm at 25°C.

11. The composition of claim 1, wherein, in ethanol, the coloring component has the shortest wavelength at which a transmittance of 50% is exhibited at a wavelength of 600 nm or more at 25° C., in a wavelength range of 650 to 800 nm.

12. The composition of claim 11, wherein, in the ethanol, the coloring component has an average transmittance of 90% or more in a wavelength range of 900 nm to 2,400 nm at 25° C.

13. A laminate comprising:
a base material layer; and
a phase transition layer which is formed on one or both surfaces of the base material layer and formed of the composition of claim 1.

14. The laminate of claim 13, further comprising a protective layer formed on the phase transition layer.

15. A window comprising:
a glass layer; and
a phase transition layer which is formed on one or both surfaces of the glass layer and formed of the composition of claim 1.

16. The composition of claim 1, wherein the coloring component is a pigment or a dyestuff.

17. A layer formed from a composition,
the composition comprising:
a phase transition material; and
a coloring component,
wherein the phase transition material is vanadium dioxide particle,
wherein the coloring component exhibits the maximum absorption peak within a wavelength range from 250 nm to 400 nm at 25° C.,
wherein the Δλ of the coloring component according to the Formula 7 below is from 100 nm to 200 nm, wherein the coloring component exhibits an absorption peak in a wavelength range from 500 nm to 800 nm in ethanol at 25° C., wherein the composition exhibits a maximum peak intensity within a range from 2,000 to 20,000 in the XRD analysis, and wherein the layer exhibits transmittance for light having a wavelength of 550 nm of 30% or more and exhibits an absolute value of $\Delta T2400$ according to Formula 1 below of 15% or more:

$$\Delta T2400 = T2400.L - T2400.H \quad \text{[Formula 1]}$$

wherein, in Formula 1, $T2400.L$ denotes a transmittance of the layer for light having a wavelength of 2,400 nm at 25° C., and $T2400.H$ denotes a transmittance of the layer for the light having the wavelength of 2,400 nm at 85° C.:

$$\Delta\lambda = \lambda L - \lambda S \quad \text{[Formula 7]}$$

wherein, in Formula 7, $\lambda L$ denotes the longest wavelength at which the coloring component in an ethanol exhibits a transmittance of 50% within a wavelength range from 300 nm to 600 nm at 25° C., and $\lambda S$ denotes the shortest wavelength at which the coloring component in the ethanol exhibits a transmittance of 50% within the wavelength range of 300 nm to 600 nm at 25° C.

* * * * *